United States Patent [19]

Klein

[11] 4,207,514
[45] Jun. 10, 1980

[54] SYSTEM AND APPARATUS FOR MONITORING OR CONTROLLING SECONDARY BATTERY OPERATION

[75] Inventor: Martin G. Klein, Brookfield, Conn.

[73] Assignee: Energy Research Corporation, Danbury, Conn.

[21] Appl. No.: 853,383

[22] Filed: Nov. 21, 1977

[51] Int. Cl.² .............................................. H02J 7/04
[52] U.S. Cl. ...................................... 320/44; 320/46; 340/636
[58] Field of Search .................... 340/636; 320/43–48, 320/37, 38

[56] References Cited

U.S. PATENT DOCUMENTS

| | | |
|---|---|---|
| 1,187,148 | 6/1916 | Hutchison . |
| 1,616,317 | 2/1927 | Hanna . |
| 3,003,100 | 10/1961 | Euwema . |
| 3,175,146 | 3/1965 | Rowe . |
| 3,356,922 | 12/1967 | Johnston .................... 320/40 X |
| 3,422,337 | 1/1969 | Carson . |
| 3,735,234 | 5/1973 | Godard ....................... 320/44 |
| 3,781,751 | 12/1973 | Sulger, Sr. ................... 320/46 X |

FOREIGN PATENT DOCUMENTS

| | | | |
|---|---|---|---|
| 44-23577 | 5/1969 | Japan ............................. 320/44 |
| 1163337 | 9/1969 | United Kingdom . |
| 1320913 | 6/1973 | United Kingdom . |
| 1331241 | 9/1973 | United Kingdom . |

*Primary Examiner*—Robert J. Hickey
*Attorney, Agent, or Firm*—Watson, Leavenworth, Kelton & Taggart

[57] ABSTRACT

The terminal current of a main secondary battery is continuously monitored throughout charging and discharging by a system having a monitor cell, such as a metal gas battery, and having circuitry for conforming monitor cell terminal current in sense, and proportionally in magnitude, to the main battery terminal current. Apparatus responsive to the monitor cell state of charge may provide sensible output indication of main battery state of charge or control charging/discharging of the main battery.

14 Claims, 3 Drawing Figures

SYSTEM AND APPARATUS FOR MONITORING OR CONTROLLING SECONDARY BATTERY OPERATION

FIELD OF THE INVENTION

This invention relates generally to secondary battery state of charge and control thereof and more particularly to system and apparatus for providing output indication of the state of charge of secondary batteries during both charging and discharging thereof.

BACKGROUND OF THE INVENTION

While various past applications of rechargeable (secondary) batteries have occasioned need for state of charge indication systems, the art has not realized a convenient and reliable method of yielding such information, except for metal gas batteries in which gas pressure provides a direct indication of state of charge. The presently active field of electric vehicle development portends even more urgent need for ready state of charge indication than past applications. State of charge indication is significant for various reasons in respect of secondary batteries for electric vehicle propulsion. In a principal instance, such indication is the direct equivalent of the customary automobile fuel gage in advising as to the remaining range capability of the vehicle. In further instances, visual indication of state of charge or electrical sensing thereof, is key to avoiding excessive overcharging and in preventing excessive discharge and cell reversal, all of which can substantially shorten the lifetime of what will apparently be a quite expensive battery. With the metal gas battery being considered generally inapplicable as a source of motive power for electric vehicles, the need for suitable charge indication/control system and apparatus is further emphasized.

Presently-known systems for monitoring secondary battery state of charge are discussed in the prior art statement filed pursuant to 37 CFR 1.97 and 1.98 herein.

SUMMARY OF THE INVENTION

The present invention has as an object thereof the provision of reliable and accurate system and apparatus for monitoring secondary battery state of charge during both charging and discharging thereof.

In the attainment of the foregoing and other objects, the invention provides a system which is responsive to the sense and magnitude of terminal current of a monitored secondary battery to conform the sense and magnitude of terminal current of a further secondary battery, denoted below as a monitor cell, during both charging and discharging of the monitored secondary battery, such that the terminal current of the monitor cell may be examined to obtain state of charge indication of the monitored battery at all times. The monitor cell is desirably a metal-gas cell whereby its pressure output may be employed directly for state of charge indication or for operating pressure-responsive switches connected in circuit with the monitored secondary battery. In a further preferred embodiment, the monitoring system of the invention provides that the terminal current of the monitor cell is exclusive of the terminal current of the monitored secondary battery, i.e., is derived from a separate supply during monitor cell charging, whereby the monitoring system is substantially electrically isolated from the monitored secondary battery. In a still further preferred form, the monitoring system of the invention provides for such degree of electrochemical commonness between the monitored secondary battery and the monitor cell as to enhance the correlation of the respective states of charge thereof with the passage of time.

The foregoing and other objects and features of the invention will be further understood by reference to the following detailed description of the preferred embodiments of system and apparatus according with the invention and from the drawings thereof wherein like reference numerals identify like reference elements throughout.

DESCRIPTION OF THE PREFERRED EMBODIMENTS

Figure 1:
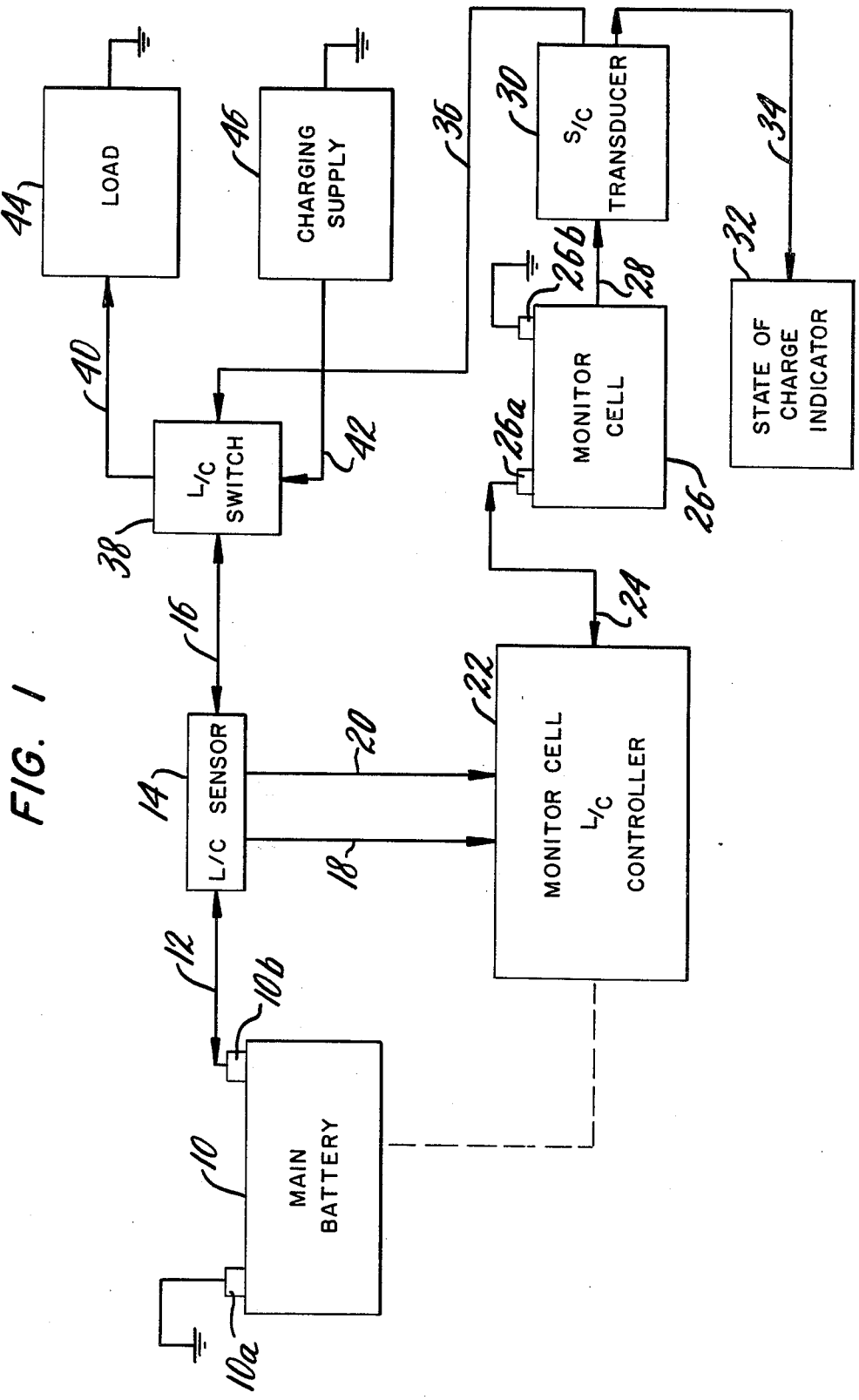
FIG. 1 is a block diagram of a system in accordance with the invention.

Referring to FIG. 1, main battery 10 has electrode 10a grounded and electrode 10b connected to line 12. Battery 10 is secondary (rechargeable) in character and may typically comprise a lead-acid or nickel-zinc battery. L/C (load/charge) sensor 14 is series-connected between line 12 and line 16 and output lines 18 and 20 extend therefrom. In a conventionally used arrangement for measuring instantaneous battery charging or discharging current, L/C sensor 14 is a series resistor (shunt) with line 18 connected to the resistor terminal proximate line 12 and line 20 connected to the resistor terminal proximate line 16. Such resistor provides, through the amplitude and relative sense of voltage difference between lines 18 and 20 an indication of the sense of main battery terminal current (current flowing from/to electrode 10b to/from electrode 10a) and the magnitude thereof. An ammeter series-connected with line 18 and line 20 thus may indicate instantaneous charging/discharging and degree thereof.

In diverse practice under the invention, lines 18 and 20 are conducted to monitor cell L/C controller 22, suitable circuit embodiments of which are discussed below in connection with FIGS. 2 and 3. In function, controller 22 draws load current from line 24 or supplies charging current thereto as a function of the sense of the voltage difference between lines 18 and 20, the magnitude of such loading/charging current being established by controller 22 in accordance with the amplitude of such line 18-line 20 voltage difference. Sensor 14 is preferably of character providing a change of differential voltage between lines 18 and 20 proportional to change in main battery 10 terminal current and controller 22 is of character providing change in line 24 current proportional to the differential voltage between lines 18 and 20.

Monitor cell 26 has electrode 26a connected to line 24 and electrode 26b connected to ground. In the preferred embodiment of the invention, cell 26 is a metal gas secondary cell comprised of a conventional solid electrode and a gas counter electrode. By way of example, suitable electrode combinations include lead oxide-hydrogen, nickel oxide-hydrogen, silver oxide-hydrogen, zinc-oxygen, cadmium-oxygen and lead-oxygen. Considering the nickel oxide-hydrogen system, the nickel electrode converts to nickelic hydroxide during cell charging and gas is evolved at the hydrogen electrode. The cell is housed in a sealed container and the quantity of gas evolved therein is proportional to the number of ampere-hours transferred through the cell. Gas pressure within the cell housing increases and decreases linearly as a function of respective charging and discharging transferred ampere-hours, thereby providing a convenient measure of cell state of charge.

With monitor cell 26 comprised of a metal gas cell, line 28 represents a pressure line extending from cell 26 to S/C (state of charge) transducer 30, which may comprise a conventional pressure transducer or gage, providing a visual or other sensible output reading in indicator 32 through line 34.

The output of transducer 30 may be conducted also over line 36 to L/C (load/charge) switch 38 whereby the switch may interconnect line 16 with either line 40 or line 42, depending upon whether main battery 10 is to be subjected to load 44 or charged by charging supply 46.

In operation of the FIG. 1 system, as main battery 10 is discharged from a charged condition, main battery terminal current flows through sensor 14 and through switch 38 to load 44. On the basis of the voltage differential between lines 18 and 20, controller 22 draws terminal current from monitor cell 26 over line 24 and accordingly loads cell 26 proportionally to the loading of main battery 10. On predetermind low pressure output on line 28, transducer 30 operates switch 38 to discontinue main battery discharge, i.e., by disconnecting lines 16 and 40 and connecting lines 16 and 42. As noted below, the system may operate alternatively in manual mode wherein switch 38 is manually shifted on the basis of indication provided by state of charge indicator 32. In the course of recharging main battery 10 in the non-manual mode, the foregoing procedure reverses itself under the influence of sensor 14 and controller 22. Thus, the sense of the voltage difference between lines 18 and 20 reverses from that existing during discharging and controller 22 is responsive to such sense change to discontinue loading of monitor cell 26 and to now conduct charging current thereto preferably from a separate current supply such that monitor cell charging current on line 24 is exclusive of charging current flowing from supply 46 to main battery 10, although proportional thereto. As indicated by the broken line in FIG. 1 extending between battery 10 and controller 22, controller power may be derived from the main battery. Monitor cell terminal current, i.e., current flowing between its electrodes, thus is conformed in sense, and is conformed proportionally in magnitude, to the terminal current of main battery 10.

Figure 2:
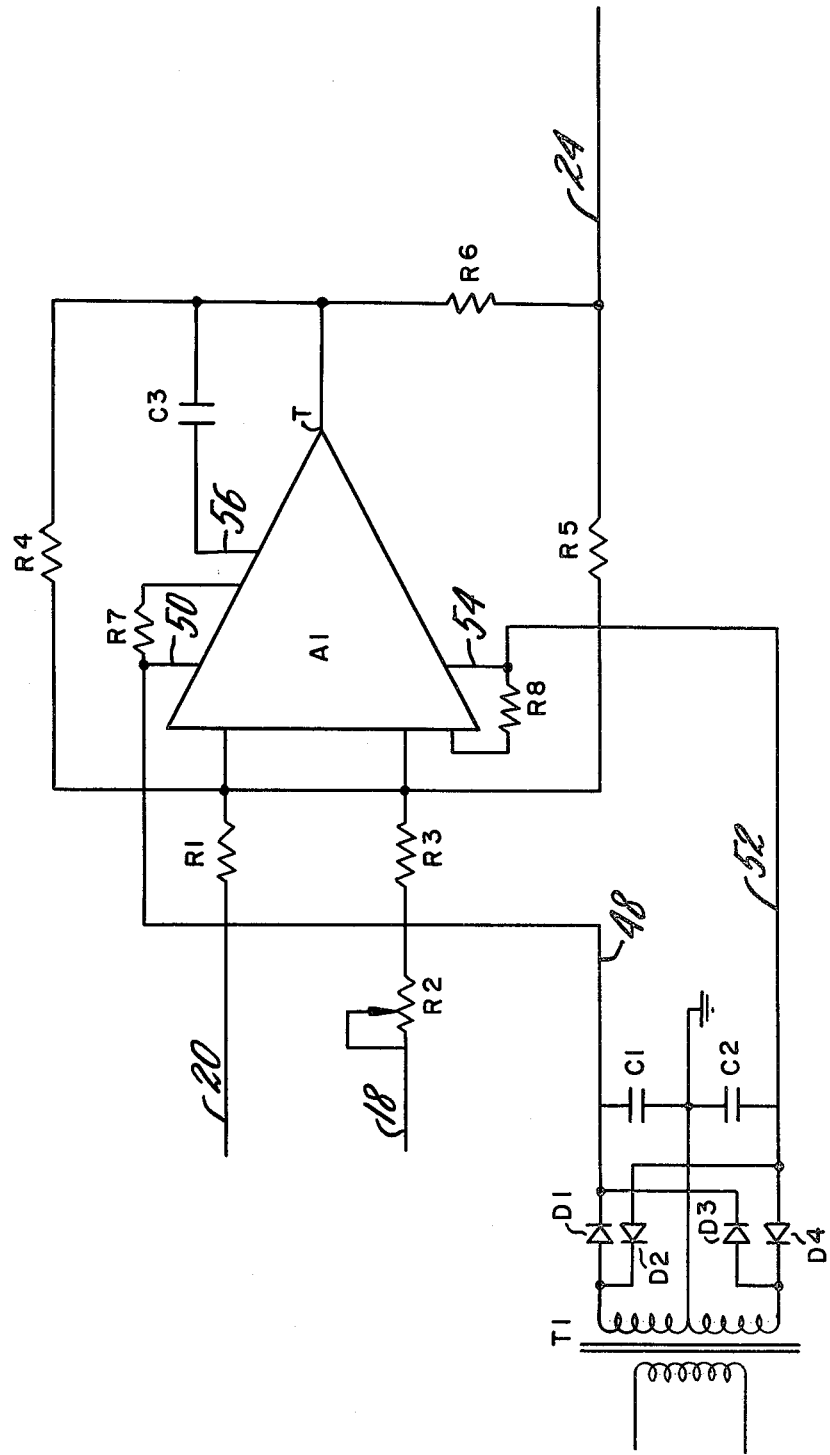
FIG. 2 is an electrical schematic diagram of one embodiment of the monitor cell L/C (load/charge) controller of the FIG. 1 system.

Turning to FIG. 2, a version of controller 22 of FIG. 1 is shown for use in the non-manual mode. Amplifier A1 is connected as a power operational amplifier capable, for example, of delivery of in excess of one ampere at plus and minus twelve volts. Line 20 is connected to a first input of amplifier A1 through resistor R1 and line 18 is connected to a second input of amplifier A1 through series resistors R2 and R3, resistor R2 being adjustable for purposes discussed below. Feedback resistors R4 and R5 set the voltage gain through to the amplifier output terminal T. Load resistor R6 is connected from output terminal T to controller output line 24. Operating power for amplifier A1 and charging current applied to line 24 for monitor cell charging are derived from a separate power supply including transformer T1, the primary winding of which is connected to a source of AC voltage, diodes D1 through D4 and capacitors C1 and C2 connected as indicated to the transformer secondary winding. Positive DC voltage is supplied by line 48 to the amplifier both directly over line 50 and through resistor R7. Negative DC voltage is applied over line 52 directly to the amplifier through line 54 and further through resistor R8. Capacitor C3 is connected between the amplifier output terminal T and line 56.

In implementing the circuit of FIG. 2, amplifier A1 may comprise a National Semiconductor power amplifier such as No. LH0021CK with appropriate heatsink. The line 20 input (R1) to the amplifier is connected to manufacturer-designated (m-d) terminal five. The line 20 input (R3) to the amplifier is connected to m-d terminal six. Line 54 is connected to m-d terminal seven and resistor R8 is series connected between m-d terminals seven and eight. Line 50 is connected to m-d terminal two and resistor R7 is series-connected between m-d terminals one and two. Line 56 is connected to m-d terminal four. Output terminal T is the casing of such commercially-available amplifier. With sensor 14 of FIG. 1 generating an output voltage of from 0 to 100 millivolts over the full range of charging and discharging operations, resistor R1 is 10K, resistor R2 is 5K and resistor R3 is 8K. Resistors R4 and R5 are selected each at 100K. Resistors R7 and R8 are each 0.5 ohm and resistor R6 is 1 ohm. Transformer T1 may comprise a Stancor Model P-8130 and diodes D1–D4 may be 1N5550 diodes. Capacitors C1 and C2 are each 220 microfarads and capacitor C3 is 3000 picofarads. Line voltage (115 VAC) is applied to the primary winding of transformer T1. With the foregoing component selection, line 48 is at +6 volts DC and line 52 is at −6 volts DC.

In use of the FIG. 2 embodiment, resistor R2 is adjusted, while main battery terminal current is zero, i.e., where the differential voltage between lines 18 and 20 is nil, so as to provide a null output voltage at terminal T. Thereafter, as line 20 becomes positive with respect to line 18, i.e., during battery charging, the circuit operates to provide a positive voltage on line 24 and thus provides for supply of charging current to the monitor cell in magnitude proportional to the positive voltage differential between lines 20 and 18. Conversely, when line 18 becomes positive with respect to line 20 as is the case with main battery discharge, the FIG. 2 circuit applies to line 24 a negative voltage, thereby drawing current from the monitor cell and dissipating it in resistor R6. Such discharge current is provided in magnitude proportional to the positive voltage differential between lines 18 and 20. As will be appreciated, amplifier A1 is desirably of very high input impedance, effectively isolating line 24 current from the terminal current of the main battery. Line 24 current, as derived from the FIG. 2 power supply circuit, is thus exclusive of main battery terminal current.

Figure 3:
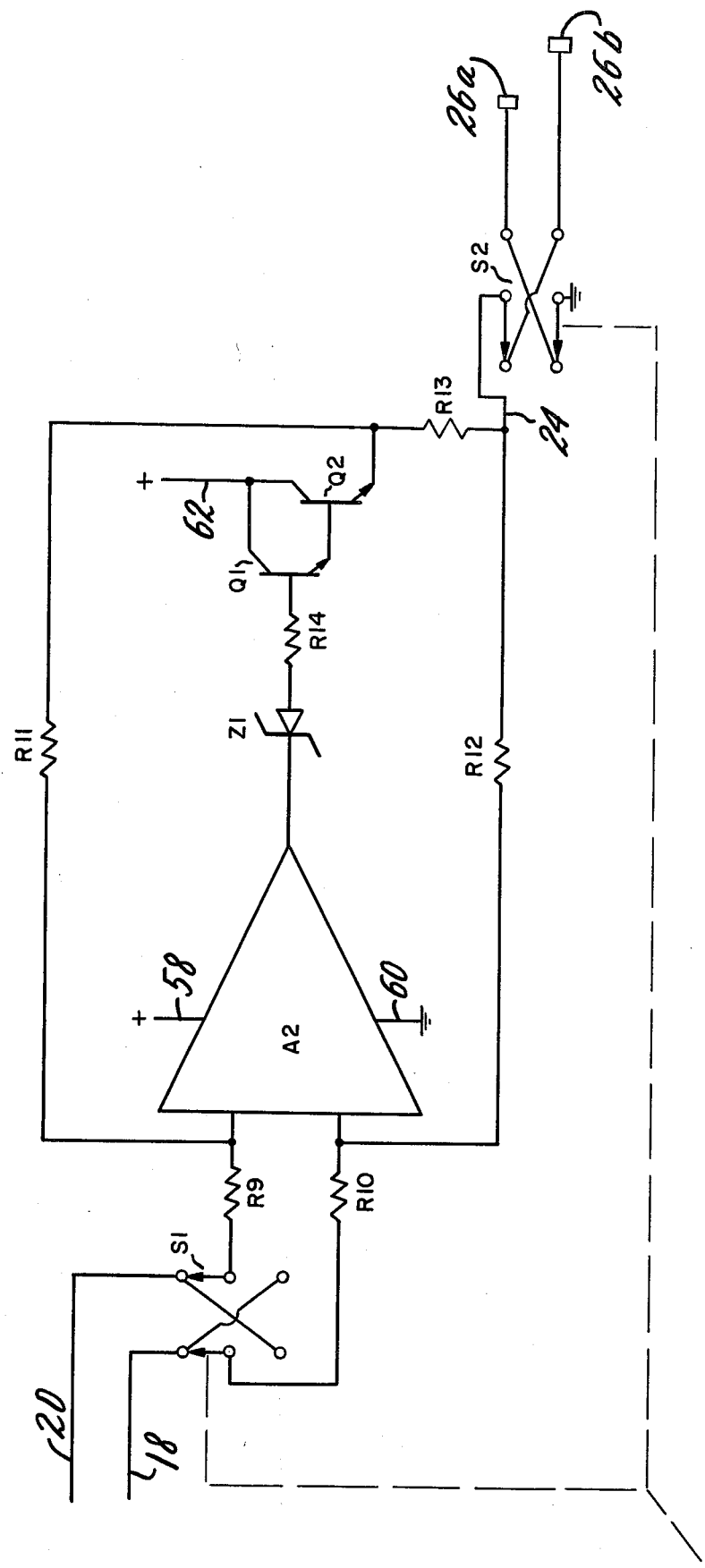
FIG. 3 is an electrical schematic diagram of another embodiment of the monitor cell L/C (load/charge) controller of FIG. 1.

Turning to FIG. 3, an embodiment of controller 22 for manual operation is shown wherein switches S1 and S2 are interconnected for joint operation and connected respectively to lines 18 and 20 and electrodes 26a and 26b of the monitor cell. In this arrangement, the FIG. 1 system showing is modified by connection of line 24 through switch S2 to the monitor cell and electrode 26b is disconnected from ground. Amplifier A2 is supplied with a single (+) polarity DC voltage on line 58 and line 60 is connected to ground. Circuit line 62 is also supplied with such single polarity DC voltage. The amplifier output voltage, applied to Zener diode Z1 thus has unidirectional excursions from ground to a positive DC voltage. Current is conducted through diode Z1 on breakdown thereof and is applied through resistor R14 to the base of transistor Q1. Q1 in turn supplies current to the base of transistor Q2. Q2 is connected in emitter-follower fashion and supplies current through resistor R13 to switch S2. Feedback is provided by resistors R11 and R12.

With switches S1 and S2 in position shown in FIG. 3, the main battery is in a discharging condition and the potential difference between lines 18 and 20 (line 20 being positive with respect to line 18) governs amplifier A2 output such that reverse current is passed through the monitor cell, i.e., switch S2 connects electrode 26a to ground and connects electrode 26b to the positive voltage supplied by the circuit on line 24. Conversely, with switches S1 and S2 reversed from their illustrated positions connection of lines 18 and 20 to amplifier A2 is reversed and monitor cell electrode 26b is grounded. The FIG. 3 circuit functions now to apply a positive voltage to electrode 26a and, hence, a charging current to the monitor cell. In both settings of switches S1 and S2, monitor cell terminal current is proportional to the voltage difference between lines 18 and 20.

In implementing the FIG. 3 controller embodiment, amplifier A2 may be Model No. NA741, commercially-available from Motorola, Zener diode Z1 may be a 4.3 volt Zener, such as No. 1N749A, and transistors Q1 and Q2 may be 2N2222A and 2N3715, respectively. Resistors R9 through R14 have respective valves 10K, 10K, 100K, 100K, 1 and 1K. For such circuit, the single polarity voltage is positive twelve volts DC. Manufacturer-designated (m-d) terminal six of the amplifier is connected to the Zener diode, m-d terminal two to R9, m-d terminal three to R10, m-d terminal 7 to line 58 and m-d terminal four to ground.

Heightened reliability in correlation of the state of charge of the monitor cell with that of the main battery is achievable particularly where electrochemical commonness is provided therebetween. The respective characteristics of the monitor cell and main battery are matched, for example, by employing the same type of solid electrode for controlling each thereof. Where the main battery is a lead-acid system and a metal gas cell is used as the monitor cell or coulometer, a lead-oxide hydrogen system, for example, would be appropriate in that an electrode of the metal gas cell and an electrode of the main battery include a common electrochemically convertible component. For a nickel-zinc main battery system, a metal gas coulometer could be nickel-hydrogen. The monitor cell would match the main battery characteristics as follows.

Where the main battery is overcharged, no additional capacity is stored in the battery. Similarly, when a metal gas secondary battery is overcharged, the gas is internally recombined and gas pressure remains constant.

During wetstand, most secondary batteries exhibit self-discharge (loss of capacity) due to the corrosion or decomposition of the active material. This process would occur at approximately the same rate in a matched metal gas cell and would be reflected in a decrease in the cell pressure.

During normal charge, a portion of the current is not used in the creation of active material and hence does not increase the state of charge of the electrodes. This same process exists in the metal gas coulometer and would be reflected in the rate of pressure rise.

If the main battery is over-discharged or reversed, no more usable capacity is removed from the main battery. This would also be reflected in the gas coulometer. When the metal electrode is exhausted in a metal gas cell, the pressure remains constant even if the cell is reversed.

Generally when secondary batteries are cycled, a portion of the active material is lost or deactivated as a function of the number of cycles. This results in capacity decay. Depending on the exact mechanism for decay, this may also be tracked by the amount of gas that is generated in the matching metal gas cell.

All secondary batteries deliver lower capacity at high rates of discharge and/or lower operating temperatures. This results from rate limiting processes within the battery which limit the utilization of a portion of the battery active material. The metal gas coulometer would not reflect capacity limits at high rates or low temperatures since the metal gas cell provides a direct indication of the quantity of charged active material in the battery electrodes, rather than the electrochemical availability of that active material for discharge. Accordingly, the main battery and metal gas coulometer should be sized and designed for the rate of discharge and temperature ranged required of the mission.

Various modifications may be introduced in the foregoing embodiments of the invention by those skilled in the art without departing from the invention. The particularly described and discussed system and apparatus are thus intended in a descriptive and not in a limiting sense. The true spirit and scope of the invention is set forth in the following claims.

What is claimed is:

1. In combination:
   (a) a first rechargeable battery;
   (b) sensor means for providing an output signal of first or second sense indicative of respective opposite senses of such first battery terminal current and indicative further of the magnitude of said first battery terminal current;
   (c) a second rechargeable battery comprising a metal gas cell; and
   (d) controller responsive to said sensor means for conducting terminal current through said second battery of magnitude proportional to such current magnitude indication of said sensor means output signal and for conforming the sense of such second battery terminal current
      (1) to one sense during first sense indication in said sensor means output signal, and
      (2) to another sense opposite said one sense during second sense indication in said sensor means output signal.

2. The invention claimed in claim 1 wherein said controller means includes current supply means for supplying said second battery terminal current, whereby said second battery terminal current is exclusive of said first battery terminal current.

3. The invention claimed in claim 1 wherein said controller means includes circuit means for generating currents of said one sense and such other sense and for supplying such generated currents selectively to a common electrode of said second battery.

4. The invention claimed in claim 1 wherein said controller means includes circuit means for generating current of single sense and switch means connected to electrodes of said second battery for reversing the manner of supplying such single sense current to said second battery electrodes.

5. The invention claimed in claim 1 wherein the metal electrode of said metal gas cell and an electrode of said first battery include a common electrochemically convertible component.

6. The invention claimed in claim 1 further including means for providing sensible output indication of gas pressure in said second battery.

7. The invention claimed in claim 1 further including switch means responsive to gas pressure in said second battery for selectively connecting said first battery with a load or a charging supply.

8. A system for use in monitoring the state of charge of a monitored secondary battery, comprising:
 (a) sensor means for providing an output signal indicative of the magnitude and sense of terminal current of such monitored battery;
 (b) a further secondary battery constituting a monitor cell, said monitor cell comprising a metal gas cell;
 (c) circuit means responsive to said sensor means output signal for conforming the sense of terminal current of said monitor cell to the sense of such monitored battery terminal current and for proportionally conforming the magnitude of such monitor cell terminal current to the magnitude of said monitored battery terminal current during both charging and loading of said monitored battery.

9. The system claimed in claim 8 wherein said circuit means includes current supply means for supplying said monitor cell terminal current, whereby said monitor cell terminal current is exclusive of said monitored battery terminal current.

10. The system claimed in claim 8 wherein said circuit means comprises means for generating currents of respective opposite senses and for supplying such generated currents selectively to a common electrode of said monitor cell.

11. The system claimed in claim 8 wherein said circuit means includes means for generating current of single sense and switch means connected to electrodes of said monitor cell for reversing the manner of supplying such single sense current to said monitor cell electrodes.

12. The system claimed in claim 8 wherein the metal electrode of said metal gas cell and an electrode of said monitored battery include a common electrochemically convertible component.

13. The system claimed in claim 8 further including means for providing sensible output indication of gas pressure in said monitor cell.

14. The system claimed in claim 8 further including switch means responsive to gas pressure in said monitor cell for selectively connecting said monitored battery with a load or a charging supply.

* * * * *